United States Patent
Chen (10) Patent No.: US 12,067,554 B2
(45) Date of Patent: Aug. 20, 2024

(54) SYSTEM, METHOD, AND APPARATUS FOR USER-LESS PAYMENT ON DELIVERY

(71) Applicant: Visa International Service Association, San Francisco, CA (US)

(72) Inventor: Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 46 days.

(21) Appl. No.: 18/091,502

(22) Filed: Dec. 30, 2022

(65) Prior Publication Data

US 2023/0139749 A1    May 4, 2023

Related U.S. Application Data (63) Continuation of application No. 16/771,538, filed as application No. PCT/US2017/065498 on Dec. 11, 2017, now Pat. No. 11,562,340.

(51) Int. Cl.

| | |
|---|---|
| *G06Q 20/32* | (2012.01) |
| *B64C 39/02* | (2023.01) |
| *B64U 101/60* | (2023.01) |
| *G06Q 10/0832* | (2023.01) |
| *G06Q 20/04* | (2012.01) |

(Continued)

(52) U.S. Cl.
CPC ....... *G06Q 20/3224* (2013.01); *B64C 39/024* (2013.01); *G06Q 10/0832* (2013.01); *G06Q 20/047* (2020.05); *G06Q 20/12* (2013.01); *G06Q 20/385* (2013.01); *G06Q 20/4014* (2013.01);

(Continued)

(58) Field of Classification Search
None
See application file for complete search history.

(56) References Cited

U.S. PATENT DOCUMENTS 9,573,684 B2 *  2/2017  Kimchi ................. B64U 10/14
9,688,404 B1     6/2017  Buchmueller et al.
(Continued)

FOREIGN PATENT DOCUMENTS

| CN | 204406476 U | 6/2015 |
|---|---|---|
| CN | 105484607 B | 3/2017 |
| WO | 2016185337 A1 | 11/2016 |

OTHER PUBLICATIONS

Perez, "Walmart partners with smart lock maker August to test in-home delivery of packages and groceries", TechCrunch, Sep. 2017, pp. 1-3, https://techcrunch.com/2017/09/21/walmart-partners-with-smart-lock-maker-august-to-test-in-home-delivery-of-packages-and-groceries/.

(Continued)

*Primary Examiner* — Gregory S Cunningham, II
(74) *Attorney, Agent, or Firm* — The Webb Law Firm (57) ABSTRACT

Described herein are systems, methods, and apparatuses for performing a user-less payment for an item upon its delivery by an unmanned delivery vehicle. The unmanned delivery vehicle may navigate to a delivery location, receive payment information, initiate a payment transaction with a remote server, and release the item at a specified location upon successful completion of the payment transaction. Upon arrival of the unmanned delivery vehicle, a wireless data transmission device may send payment information to a remote server, and the remote server may provide the unmanned delivery vehicle with an indication of whether the item can be released and a specific location at which the item can be released.

16 Claims, 5 Drawing Sheets

(51) Int. Cl.
   *G06Q 20/12* (2012.01)
   *G06Q 20/38* (2012.01)
   *G06Q 20/40* (2012.01)

(52) U.S. Cl.
   CPC ..... *G06Q 20/4015* (2020.05); *B64U 2101/60* (2023.01)

(56) References Cited

U.S. PATENT DOCUMENTS

| | | |
|---|---|---|
| 2014/0254896 A1 | 9/2014 | Zhou et al. |
| 2015/0006005 A1 | 1/2015 | Yu et al. |
| 2015/0183528 A1 | 7/2015 | Walsh et al. |
| 2016/0033966 A1 | 2/2016 | Farris et al. |
| 2016/0068264 A1* | 3/2016 | Ganesh .................. G05D 1/042 701/4 |
| 2016/0239803 A1* | 8/2016 | Borley .................. B64C 39/024 |
| 2016/0300187 A1 | 10/2016 | Kashi et al. |
| 2017/0073085 A1 | 3/2017 | Tremblay et al. |
| 2017/0228690 A1 | 8/2017 | Kohli |
| 2017/0286892 A1 | 10/2017 | Studnicka |
| 2018/0121914 A1 | 5/2018 | Badenhorst |
| 2018/0174102 A1* | 6/2018 | Winkle ............ G06Q 10/08355 |
| 2018/0240067 A1* | 8/2018 | Oz ..................... G07C 9/00182 |
| 2020/0046156 A1 | 2/2020 | Holzer |
| 2021/0142276 A1 | 5/2021 | Gupte |

OTHER PUBLICATIONS

Popper, "Amazon Key is a new service that lets couriers unlock your front door", The Verge, Oct. 2017, pp. 1-5, https://www.theverge.com/2017/10/25/16538834/amazon-key-in-home-delivery-unlock-door-prime-cloud-cam-smart-lock.

* cited by examiner

SYSTEM, METHOD, AND APPARATUS FOR USER-LESS PAYMENT ON DELIVERY

CROSS REFERENCE TO RELATED APPLICATIONS

This application is a continuation of U.S. patent application Ser. No. 16/771,538, filed Dec. 11, 2017, which is a United States national phase of International Application No. PCT/US2017/065498, filed Dec. 11, 2017, the disclosures of which are hereby incorporated by reference in their entirety.

BACKGROUND

When customers order products by phone or over the Internet, they typically provide payment information to a merchant at the time the order is placed and are subsequently charged either at that time or upon the merchant sending/shipping that product. This is undesirable for a number of reasons: (1) if the goods never arrive, or are lost/stolen in transit, the customer has already been charged for the purchase and must dispute the charges with the merchant, payment provider, or issuing bank; (2) the customer has parted with funds, despite not yet receiving goods, thus resulting in lost interest income or lost liquidity during the shipping period, which can comprise a number of weeks; and (3) in most payment card systems, e-commerce transactions are considered to be "card not present," thus increasing the fees paid by a merchant on those transactions, and placing the liability for the transaction on the merchant or its acquiring bank. Accordingly, there is a need for a way to allow a customer to provide payment on-delivery without requiring the customer's (e.g., the recipient's) presence.

SUMMARY

Non-limiting embodiments of the disclosure are directed to systems, methods, and apparatuses for the delivery of products and/or the making of a payment for products without the need for involvement or presence of, or intervention by, human actors. In some non-limiting embodiments or aspects, a customer (e.g., a consumer) may maintain a wireless data transmission device within their home or place of business capable of detecting an incoming delivery vehicle transporting a package for which the customer is an intended recipient, or alternatively, the device may be capable of being detected by the incoming delivery vehicle. Upon detection, the device may communicate with the delivery vehicle and provide payment information to the delivery vehicle such that a purchase transaction may be performed. In some non-limiting embodiments or aspects, upon receipt of payment information, a package delivery vehicle may proceed to "charge" the customer for the goods by relaying the payment information to a remote server, which may then perform payment processing. Upon successful completion of a payment transaction, the delivery vehicle may receive an indication as to whether the package may be left. In some non-limiting embodiments or aspects, the delivery vehicle may receive one or more specific locations on the customer's premises for package drop-off. In some non-limiting embodiments or aspects, the delivery vehicle may receive instructions indicating that the package should be delivered to an alternate location.

Benefits of the non-limiting embodiments disclosed herein include allowing a customer to wait until an item is delivered before having to pay for it, which results in no need for the customer to assume the responsibility for interacting with a merchant and obtaining a refund if an item does not arrive. Additional benefits include delivery confirmation, which increases the overall reliability of e-commerce, as well as no loss in liquidity by the customer during the item shipping period. Additionally, a benefit to merchants is that such transactions could be recognized by payment card networks and financial institutions as "card-present" transactions, which may enable those merchants to receive more favorable interchange rates. These and other embodiments of the disclosure are described in further detail below.

According to some non-limiting embodiments or aspects, an item delivery system comprises a wireless data transmission device; and an unmanned delivery vehicle configured to: transport an item to a recipient location; wirelessly receive payment information upon arrival at the recipient location; wirelessly transmit the payment information to a remote server; wirelessly receive an indication that the item is to be released; and release the item at the recipient location; wherein the wireless data transmission device is configured to wirelessly transmit the payment information to the unmanned delivery vehicle.

In some non-limiting embodiments or aspects, the wireless data transmission device is further configured to automatically detect the presence of the unmanned delivery vehicle.

In some non-limiting embodiments or aspects, the unmanned delivery vehicle is further configured to automatically detect the presence of the wireless data transmission device.

In some non-limiting embodiments or aspects, the wireless data transmission device is further configured to send to the unmanned delivery vehicle the indication that the item is to be released.

In some non-limiting embodiments or aspects, the wireless data transmission device is further configured to send to the unmanned delivery vehicle an item release location.

In some non-limiting embodiments or aspects, the item release location comprises at least one of a physical address, location coordinates, a business name, or any combination thereof.

In some non-limiting embodiments or aspects, the wireless data transmission device is further configured to: obtain, from a remote server, the payment information; and store, in a tamper resistant memory, the payment information.

In some non-limiting embodiments or aspects, the payment information comprises a payment token.

In some non-limiting embodiments or aspects, the unmanned delivery vehicle and the wireless data transmission device are further configured to operate without user intervention.

In some non-limiting embodiments or aspects, the unmanned delivery vehicle is further configured to send, to the wireless data transmission device, a transaction receipt.

According to some non-limiting embodiments or aspects, provided is a method for delivering an item comprising navigating to a recipient location with the item on-board; receiving payment information upon arrival at the recipient location; transmitting the payment information to a remote server; receiving an indication of whether the item is to be released; and releasing the item if the indication received was positive.

In some non-limiting embodiments or aspects, the payment information is transmitted within an authorization request message.

In some non-limiting embodiments or aspects, the payment information is received from a wireless data transmission device.

In some non-limiting embodiments or aspects, the payment information is received from the wireless data transmission device over a medium-range wireless communication channel.

In some non-limiting embodiments or aspects, the payment information is transmitted through the wireless data transmission device to the remote server.

In some non-limiting embodiments or aspects, the method further comprises detecting the presence of a wireless data transmission device.

In some non-limiting embodiments or aspects, payment information is transmitted to the remote server over a long-range wireless communication channel.

According to some non-limiting embodiments or aspects, provided is a method for accepting delivery of an item comprising detecting an unmanned delivery vehicle transporting the item; transmitting payment information to the unmanned delivery vehicle; and providing an item release location to the unmanned delivery vehicle.

In some non-limiting embodiments or aspects, the item release location comprises at least one of a physical address, location coordinates, a business name, or any combination thereof.

In some non-limiting embodiments or aspects, the method further comprises obtaining, from a remote server, the payment information; and storing, in a tamper resistant memory, the payment information.

In some non-limiting embodiments or aspects, the payment information comprises a payment token.

In some non-limiting embodiments or aspects, the method further comprises transmitting, to the unmanned delivery vehicle, information identifying at least one of the item, an order, an identity of an intended recipient, or any combination thereof.

In some non-limiting embodiments or aspects, the method further comprises opening a secured location for entry by the unmanned delivery vehicle, wherein access to the secured location is required to reach the item release location.

Further non-limiting embodiments or aspects are set forth in the following numbered clauses:

Clause 1: An item delivery system comprising: a wireless data transmission device; an unmanned delivery vehicle configured to: transport an item to a recipient location; wirelessly receive payment information upon arrival at the recipient location; wirelessly transmit the payment information to a remote server; wirelessly receive an indication that the item is to be released; and release the item at the recipient location; wherein the wireless data transmission device is configured to: wirelessly transmit the payment information to the unmanned delivery vehicle.

Clause 2: The item delivery system of clause 1, wherein the wireless data transmission device is further configured to automatically detect the presence of the unmanned delivery vehicle.

Clause 3: The item delivery system of clause 1 or 2, wherein the unmanned delivery vehicle is further configured to automatically detect the presence of the wireless data transmission device.

Clause 4: The item delivery system of any of clauses 1-3, wherein the wireless data transmission device is further configured to send to the unmanned delivery vehicle the indication that the item is to be released.

Clause 5: The item delivery system of any of clauses 1-4, wherein the wireless data transmission device is further configured to send to the unmanned delivery vehicle an item release location.

Clause 6: The item delivery system of any of clauses 1-5, wherein the item release location comprises at least one of a physical address, location coordinates, a business name, or any combination thereof.

Clause 7: The item delivery system of any of clauses 1-6, wherein the wireless data transmission device is further configured to: obtain, from a remote server, the payment information; and store, in a tamper resistant memory, the payment information Clause 8: The item delivery system of any of clauses 1-7, wherein the payment information comprises a payment token.

Clause 9: The item delivery system of any of clauses 1-8, wherein the unmanned delivery vehicle and the wireless data transmission device are further configured to operate without user intervention Clause 10: The item delivery system of any of clauses 1-9, wherein the unmanned delivery vehicle is further configured to send, to the wireless data transmission device, a transaction receipt.

Clause 11: A method for delivering an item comprising: navigating to a recipient location with the item on-board; receiving payment information upon arrival at the recipient location; transmitting the payment information to a remote server; receiving an indication of whether the item is to be released; and releasing the item if the indication received was positive.

Clause 12: The method of clause 11, wherein the payment information is transmitted within an authorization request message.

Clause 13: The method of clause 11 or 12, wherein the payment information is received from a wireless data transmission device.

Clause 14: The method of any of clauses 10-13, wherein the payment information is received from the wireless data transmission device over a medium-range wireless communication channel.

Clause 15: The method of any of clauses 10-14, wherein the payment information is transmitted through the wireless data transmission device to the remote server.

Clause 16: The method of any of clauses 10-15, further comprising detecting the presence of a wireless data transmission device.

Clause 17: The method of any of clauses 10-16, wherein the payment information is transmitted to the remote server over a long-range wireless communication channel Clause 18: A method for accepting delivery of an item, the method comprising: detecting an unmanned delivery vehicle transporting an item; transmitting payment information to the unmanned delivery vehicle; and providing an item release location to the unmanned delivery vehicle.

Clause 19: The method of clause 18, wherein the item release location comprises at least one of a physical address, location coordinates, a business name, or any combination thereof.

Clause 20: The method of clause 18 or 19, further comprising: obtaining, from a remote server, the payment information; and storing, in a tamper-resistant memory, the payment information.

Clause 21: The method of any of clauses 18-20, wherein the payment information comprises a payment token.

Clause 22: The method of any of clauses 18-21, further comprising: transmitting, to the unmanned delivery vehicle, information identifying at least one of the item, an order, an identity of an intended recipient, or any combination thereof.

Clause 23: The method of any of clauses 18-22, further comprising: opening a secured location for entry by the unmanned delivery vehicle, wherein access to the secured location is required to reach the item release location.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION

In the following description, various embodiments will be described. For purposes of explanation, specific configurations and details are set forth in order to provide a thorough understanding of the non-limiting embodiments. However, it will also be apparent to one skilled in the art that the non-limiting embodiments may be practiced without the specific details. Furthermore, well-known features may be omitted or simplified in order not to obscure the embodiment being described. Prior to discussing embodiments of the invention, description of some terms may be helpful in understanding these embodiments.

"Communication" and "communicate" refer to the receipt or transfer of one or more signals, messages, calls, commands, or other type of data. For one unit (e.g., any device, system, or component thereof) to be in communication with another unit means that the one unit is able to receive data from and/or transmit data to the other unit. A communication may use a direct or indirect connection and may be wired and/or wireless in nature. Additionally, two units may be in communication with each other even though the data transmitted may be modified, processed, routed, etc., between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

A "communication channel" may refer to any suitable path for communication between two or more entities. Any suitable communication protocols may be used for generating a communication channel. A communication channel may in some instance comprise a "secure communication channel" or a "tunnel," either of which may be established in any known manner, including the use of mutual authentication and a session key and establishment of an SSL session. However, any method of creating a secure channel may be used, and communication channels may be wired or wireless, as well as long-range, short-range, or medium-range.

A "long-range wireless communication channel" may include a communication channel, at least a portion of which occurs over radio-frequency, microwave, optical/light, or any other suitable technique operable over distances above fifty meters. Non-limiting examples of such communication channels include the use of technologies such as cellular networks, space-based satellites, packet radio, or long-range optical communications. Some non-limiting examples of specific protocols and specifications in these technologies include LTE, WiMax/IEEE 802.16, CDMA, HSPA, UMTS, IS-2000, IS-95, and GSM. It will be understood and appreciated that some of the non-limiting examples may also be suitable for use at distances below fifty meters, as well, and therefore, their inclusion in this definition is not intended to exclude them as non-limiting examples of medium-range wireless communication channels.

A "medium-range wireless communication channel" may include a communication channel, at least a portion of which occurs over electromagnetic wave technology, including but not limited to radio-frequency, microwave, optical/light, or any other suitable technique operable over distances below fifty meters. Non-limiting examples of such communication channels include the use of defined standards such as WiFi® (defined as the family of IEEE 802.11 specifications), Bluetooth®, Bluetooth Low Energy ("BLE"), WPAN (defined as the family of IEEE 802.15 specifications), mesh networking protocols such as Zigbee® or Z-Wave®, and Li-Fi. It will be understood and appreciated that some of the non-limiting examples may also be suitable for use at distances above fifty meters, as well, and therefore, their inclusion in this definition is not intended to exclude them as non-limiting examples of long-range wireless communication channels.

"Payment information" may include payment account information or digital representations of value that can be used in a payment transaction. Non-limiting examples of payment information may include a PAN (primary account number or "account number"), a bank account number, a credit card or debit card number, health insurance information, gift card account data, loyalty account information, and any additional information required to supplement such data, including an expiration date, a CVV2 value, name, and billing address. Payment information may also include any data representative of the aforementioned payment account information, such as a payment token, or any other account alias. Payment information may also include data associated with crypto-currencies.

A "payment token" or "token" may include an identifier for a payment account that is a substitute for an account identifier, such as a PAN. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived. Further, in some non-limiting embodiments or aspects, the token format may be configured to allow the entity receiving the payment token to identify it as a payment token and recognize the entity that issued the token.

A "remote server" may include one or more computing devices, which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a remote server as described herein may, but need not, reside at (or be operated by) a merchant, a shipping company, an acquiring bank, a payment network, a financial institution, a cryptocurrency transaction network (such as a public or private blockchain), or agents of any of the aforementioned entities.

A "tamper-resistant memory" may include a secure computer memory in an electronic device capable of storing sensitive data or applications. A tamper-resistant memory may, but need not be, physically isolated from other memory in an electronic device. A tamper-resistant memory may comprise, or may be contained within, a secure element, a hardware security module, a software security module, or other mechanism providing for secure and controlled access to the data stored within it. Tamper-resistant memory may further comprise a dedicated crypto-processor used for accessing its contents and executing secure operations.

A "token requestor" may refer to an entity that is seeking to implement tokenization according to embodiments of the present disclosure. The token requestor may initiate a request that a PAN be tokenized by submitting a token request message to the token service provider. According to various embodiments discussed herein, a token requestor may no longer need to store a PAN associated with a token once the requestor has received the payment token in response to a token request message. The requestor may be an application, a device, a process, or a system that is configured to perform actions associated with tokens. For example, a requestor can request registration with a network token system, request token generation, token activation, token de-activation, token exchange, other token lifecycle management related processes, and/or any other token related processes. A requestor may interface with a network token system through any suitable communication network and/or protocol (e.g., using HTTPS, SOAP and/or an XML interface among others). Some non-limiting examples of token requestors may include, for example, card-on-file merchants, acquirers, acquirer processors, and payment gateways acting on behalf of merchants, payment enablers (e.g., original equipment manufacturers, mobile network operators, etc.), digital wallet providers, issuers, third-party wallet providers, and/or payment processing networks. In some non-limiting embodiments or aspects, a token requestor can request tokens for multiple domains and/or channels. A token requestor may be registered and identified uniquely by the token service provider within the tokenization ecosystem. During token requestor registration, the token service provider may formally process a token requestor's application to participate in the token service system. The token service provider may collect information pertaining to the nature of the requestor and relevant use of tokens to validate and formally approve the token requestor and establish appropriate domain restriction controls. Successfully registered token requestors may be assigned a token requestor identifier that may also be entered and maintained within the token vault. Token requestors can be revoked or assigned new token requestor identifiers. This information may be subject to reporting and audit by the token service provider.

A "token service provider" may refer to an entity including one or more server computers in a token service system that generates, processes and maintains payment tokens. The token service provider may include or be in communication with a token vault where the generated tokens are stored. Specifically, the token vault may maintain one-to-one mapping between a token and a PAN represented by the token. The token service provider may have the ability to set aside licensed BINs as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments of the present disclosure. A token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. The EMVCo standards organization has published specifications defining how tokenized systems may operate. While such specifications may be informative, they are not intended to be limiting upon any of the non-limiting embodiments disclosed herein.

A "token vault" may refer to a repository that maintains established token-to-PAN mappings. According to various embodiments, the token vault may also maintain other attributes of the token requestor that may be determined at the time of registration and that may be used by the token service provider to apply domain restrictions or other controls during transaction processing. The token vault may be a part of the token service system. In some non-limiting embodiments or aspects, the token vault may be provided as a part of the token service provider. Alternatively, the token vault may be a remote repository accessible by the token service provider. Token vaults, due to the sensitive nature of the data mappings that are stored and managed in them, may be protected by strong underlying physical and logical security.

An "unmanned delivery vehicle" or "drone" may include any type of remotely controlled or autonomous vehicles capable of transporting an item to a specified location. Such vehicles may be self-powered ground, water, or aerial transportation vehicles. Some non-limiting examples of unmanned delivery vehicles include the AAI RQ-7 Shadow, the Microdrones md4-1000, the Workhorse HorseFly Autonomous Drone, and the Amazon Prime Air delivery vehicles.

A "wireless data transmission device" may be a fixed or portable device capable of storing and communicating, among other things, payment information and other data over at least one wireless communication channel. In some non-limiting embodiments or aspects, a wireless data transmission device may have a connection to the Internet, and may also be capable of communicating with devices in proximity over a variety of wireless communication channels. A wireless data transmission device may also be or function as a modem, router, network switch, repeater, home automation hub, a smartphone, a tablet computer, or other type of computing, networking, or telecommunications equipment.

Figure 1:
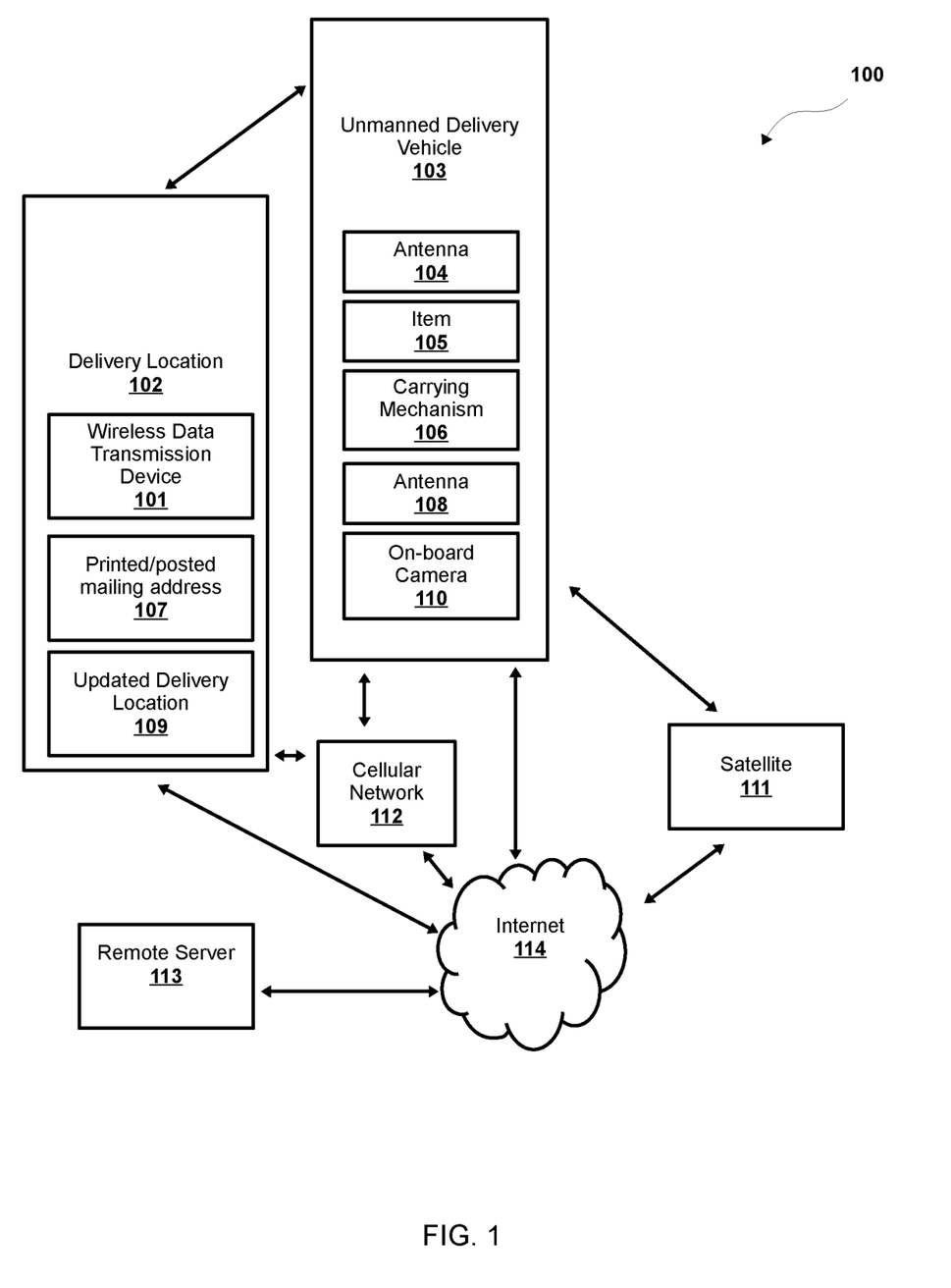
FIG. 1 depicts an illustrative non-limiting example of a system for implementing the delivery of, and payment for, packages that enables the automated receipt of payment at the point of delivery.

Turning now to the figures, FIG. 1 depicts an illustrative example of a system 100 in which techniques for implementing a user-less payment on-delivery of an item 105 may be implemented. System 100 may include a wireless data transmission device 101, which is capable of communicating with an unmanned delivery vehicle 103 via its antenna 108. In some non-limiting embodiments or aspects, unmanned delivery vehicle 103 navigates to a delivery location, which may occur through map-based autonomous navigation, remote-control piloting, or any other method of finding a destination, all of which may involve the use of an on-board camera 110. Unmanned delivery vehicle 103 may optionally utilize environmental data, such as a printed/posted mailing address 107 displayed on a mailbox or image recognition of a delivery location 102 to confirm that it has reached the intended delivery location. It should be appreciated that unmanned delivery vehicle 103 may recognize that it has arrived at the appropriate delivery location via a number of possible techniques, other non-limiting examples of which include analysis of current Global Positioning System ("GPS") coordinates, cellular triangulation, or through any other suitable techniques. In some non-limiting embodiments or aspects, wireless data transmission device 101 detects the approaching unmanned delivery vehicle 103. In some non-limiting embodiments or aspects, unmanned delivery vehicle 103 may detect the presence of wireless data transmission device 101. Such detection could optionally occur by any operable detection mechanism, such as RF interrogation, RADAR, photographic recognition, or communication via a medium-range wireless communication channel.

After detection, it may be necessary for unmanned delivery vehicle 103 and wireless data transmission device 101 to authenticate each other and establish trust. In some non-limiting embodiments or aspects, this could occur through the exchange and verification of secret codes provided to each other. Such secret codes could be provided by a merchant, shipper, or any other entity known and trusted by both parties. In some non-limiting embodiments or aspects, these secret codes could be verified by each device locally, if each device had previously received the other's secret code. In some non-limiting embodiments or aspects, wireless data transmission device 101 may send its secret code to unmanned delivery vehicle 103, and unmanned delivery vehicle 103 may send its secret code to wireless data transmission device 101. Each entity may then verify those secret codes with a mutually trusted party, which could be the merchant, shipper, or any other trusted entity. It will be appreciated that there are many ways for devices to establish trust with each other, and that the foregoing recites only one such technique.

Wireless data transmission device 101 may optionally wish to confirm that an item 105 being transported by unmanned delivery vehicle 103 is an item that is expected for delivery. This confirmation may occur before or after the establishment of trust between unmanned delivery vehicle 103 and wireless data transmission device 101. Confirmation of item 105 may occur by unmanned delivery vehicle 103 communicating information about an item, such as an order number, an item number, a SKU, a product name, or any other information suitable for identifying item 105, as well as information identifying the intended recipient. Upon receipt of such information, wireless data transmission device 101 may compare that information against previously stored information. It will be appreciated that wireless data transmission device 101 could "reject" delivery by transmitting delivery instructions indicating such rejection.

Upon successfully establishing trust between wireless data transmission device 101 and unmanned delivery vehicle 103, wireless data transmission device 101 may send payment information and delivery instructions to unmanned delivery vehicle 103 over a wireless communication channel, which may be received via antenna 108. In some non-limiting embodiments or aspects, this communication would occur over a medium-range wireless communication channel, non-limiting examples of which could include WiFi®, Bluetooth®, WPAN, Li-Fi, or any other suitable technique. Unmanned delivery vehicle 103 may then send payment information to a remote server 113 for payment processing over a long-range wireless communication channel via an antenna 104. In some non-limiting embodiments or aspects, this payment information comprises a PAN, such as those used in the Visa® or MasterCard® payment networks, and unmanned delivery vehicle 103 may populate an ISO 8583 authorization request message containing this payment information, and may send that message to remote server 113 for payment processing. Such processing may further comprise remote server 113 transmitting the payment data to a payment network, financial institution, or other location for transaction approval or decline. In such an embodiment, remote server 113 may receive a response indicating whether the transaction was approved or declined. Remote server 113 may also inform unmanned delivery vehicle 103 of whether a transaction was approved or declined. Upon a transaction decline, unmanned delivery vehicle 103 may retry the payment transaction, or may inform wireless data transmission device 101, which may optionally provide different payment information to unmanned delivery vehicle 103. If the transaction is again declined, unmanned delivery vehicle 103 may return to its original dispatch location without releasing item 105.

Upon transaction approval, remote server 113 may send an approval message to unmanned delivery vehicle 103, indicating that the transaction was approved, and that further providing an indication or instruction that item 105 may be released in accordance with any delivery instructions otherwise received from wireless data transmission device 101. The delivery instructions communicated to unmanned delivery vehicle 103 may include geographic coordinates, degrees/minutes/seconds, a postal address, a business name, or any other information useful in identifying a location to which an item may be delivered. It will be appreciated that such delivery instructions need not refer to a location that is within the vicinity of the original delivery location 102 or printed/posted mailing address 107.

In some non-limiting embodiments or aspects as depicted in FIG. 1, wireless data transmission device 101 may instruct unmanned delivery vehicle 103 to release item 105 at an updated delivery location 109, which represents a doorstep located at delivery location 102. Release of item 105 may occur by unlocking release and carrying mechanism 106. Release and carrying mechanism 106 may be any suitable device capable of securely holding, carrying, and releasing an item, non-limiting examples of which may include a clamp, grip, claw, hook, or projectile canon. In some non-limiting embodiments or aspects, release and carrying mechanism 106 may be operated and controlled by locally or remotely stored software to ensure safe and accurate placement of the item. In the non-limiting embodiment or aspect depicted in FIG. 1, unmanned delivery vehicle 103 is an aerial transport vehicle. However, it will be appreciated that unmanned delivery vehicle 103 may be a land or water-based vehicle, as well. In such circumstances, it may not be possible to directly access updated delivery location 109, in which case, unmanned delivery vehicle 103 may release item 105 at the nearest location accessible to it, or unmanned delivery vehicle 103 may be equipped with a specialized release mechanism capable of enabling item 105 to be accurately placed at updated delivery location 109, which could occur in any operable way, including by spring and/or gas-powered projectile technology, for example. In such embodiments, unmanned delivery vehicle 103 may consider, compare, or evaluate the contents, durability, or fragility of item 105 against any predefined rules relating to the item ability to withstand high-altitude release, projection through the air, or any other method of release that might cause damage to item 105. Alternatively, unmanned delivery vehicle 103 may inform wireless data transmission device 101 that updated delivery location 109 is not directly accessible to it and may request an alternative location. In some non-limiting embodiments or aspects, wireless data transmission device 101 may grant access to otherwise secured physical areas in or around original delivery location 102. As a non-limiting example, wireless data transmission device 101, if enabled with home or building automation features, may cause a door or window to be unlocked and opened. A non-limiting example of this might be through the opening of a radio controlled garage door, thereby allowing for unmanned delivery vehicle 103 to release item 105 within an otherwise enclosed or secure area. Upon the departure of unmanned delivery vehicle 103, wireless data transmission device 101 may close the door or window. It will be appreciated by a person of skill in the art that such communications necessary to allow access to specific areas could occur via a wired or wireless communication channel or through any other appropriate medium.

Payment information and delivery instructions may be communicated via various channels. In some non-limiting embodiments or aspects, wireless data transmission device 101 may communicate payment data and delivery information and instructions to unmanned delivery vehicle 103 over a medium-range wireless communication channel, and unmanned delivery vehicle 103 may then act as a wireless POS device by transmitting payment information to remote server 113 via antenna 104 and over a long-range wireless communication protocol, such as a satellite link 111, or a cellular network link 112 and then through an Internet network 114. In some non-limiting embodiments or aspects, unmanned delivery vehicle 103 may send the payment information back to wireless data transmission device 101 using the already established medium-range wireless communication channel for transmission to remote server 113 via wireless data transmission device's 101 Internet connection. In such an embodiment, unmanned delivery vehicle 103 may establish a secure "tunnel" over which it may provide the payment information to remote server 113. Such a configuration may be necessary in situations in which unmanned delivery vehicle 103 is unable to utilize a long-range communication channel. In some non-limiting embodiments or aspects, wireless data transmission device 101 may send payment information and optionally delivery instructions to remote server 113, via its own connection to Internet network 114, instead of sending such information to unmanned delivery vehicle 103. In such embodiments, upon receipt of the payment information by remote server 113, remote server 113 may transmit the payment data to a financial institution, payment network, or other location for enabling transaction approval or decline. In such embodiments, remote server 113 may receive a response indicating whether the transaction was approved or declined. Remote server 113 may also inform unmanned delivery vehicle 103 of whether a transaction was approved or declined, and if approved, may also provide an indication of whether item 105 may be released, and optionally, remote server 113 may also provide additional delivery instructions to unmanned delivery vehicle 103. This communication could occur over a long-range wireless communication channel, or back through wireless data transmission device 101 and its medium-range wireless communication channel. In any embodiments in which communications between unmanned delivery vehicle 103 and remote server 113 occur through wireless data transmission device 101, such messages could be digitally signed via the use of digital certificates or any other operable cryptographic techniques to allow each party to confirm the authenticity of the messages.

Figure 2A:
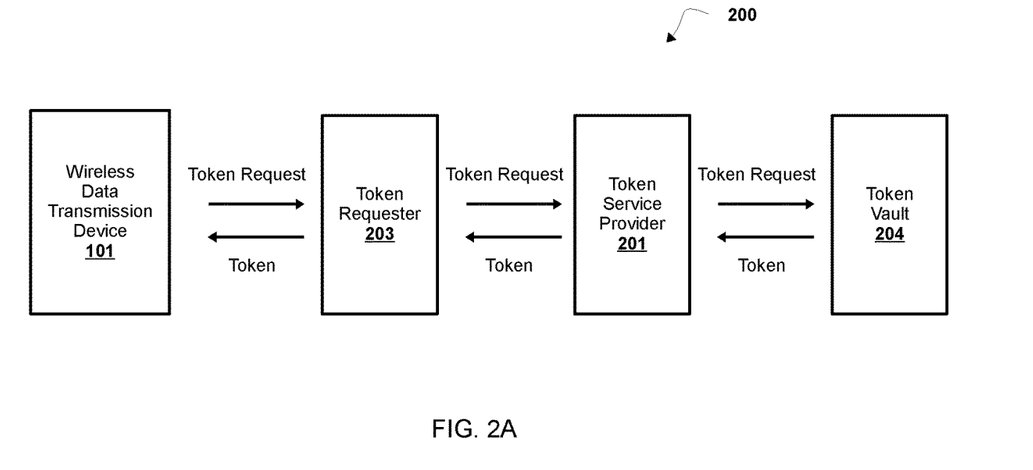
FIG. 2A depicts aspects of a process flow that may be present when a wireless data transmission device requests and receives a payment token.

In some non-limiting embodiments or aspects, wireless data transmission device 101 may provide payment for an item via a "push payment" transaction. In such instances, unmanned delivery vehicle 103 may provide payment information to wireless data transmission device 101. However, in such an embodiment, wireless data transmission device 101 would instruct a financial institution to transmit funds to an account corresponding to the payment information provided by unmanned delivery vehicle 103. Non-limiting examples of such transactions include the Visa Inc.'s Visa Direct product offering, Visa Inc's Original Credit Transaction message ("OCT"), an Automated Clearing House ("ACH") credit push transaction, a bank wire transfer, or any other suitable technique. FIG. 2A depicts aspects of a process flow 200 that may be present when a wireless data transmission device 101 requests and receives a payment token. The owner or operator of wireless data transmission device 101 may wish to store certain payment information within that device. In some non-limiting embodiments or aspects of the disclosure, such payment information may be stored in a tamper-resistant memory within wireless data transmission device 101, and in some non-limiting embodiments or aspects, the payment information that is stored will be "tokenized." As a preliminary step, which is not depicted in FIG. 2A, the owner or operator of wireless data transmission device 101 may attempt to load existing payment information into wireless data transmission device 101. This could occur during device setup or at some point during its configuration and may trigger the generation and submission of a token request.

In some non-limiting embodiments or aspects, wireless data transmission device 101 may submit a token request to token requestor 203. In some non-limiting embodiments or aspects, wireless data transmission device 101 may perform the functions of token requestor 203, and thus need not interact with token requestor 203. The exact contents of the token request may be specific to the token service provider, but non-limiting examples of such a request may include a primary account number, an identifier of the requesting device or user, or any other data necessary for a token service provider to provision a token to the wireless data transmission device 101. Token requestor 203 may receive the token request from wireless data transmission device 101, and may reformat the request and may add additional data to it, or token requestor 203 may forward the token request to a token service provider 201. It should be appreciated that a token service provider need not be part of a payment network and could be operated by any other entity, including an issuer financial institution or third party. Upon receipt of the token request, token service provider 201 may communicate with token vault 204 by sending all or some aspects of the token request to token vault 204. Token vault 204 may then provide token service provider 201 with a payment token corresponding to the payment information, which may be sent back to wireless data transmission device 101 via token requestor 203. Wireless data transmission device 101 may store the payment token received in a tamper-resistant memory, and may then provide the payment token to unmanned delivery vehicles for payment of delivered packages. It should be appreciated by a person of skill in the art that numerous configurations are possible, and that a token vault may be operated by any suitable entity, including issuers, clearing houses, other financial institutions, or any other entity.

Figure 2B:
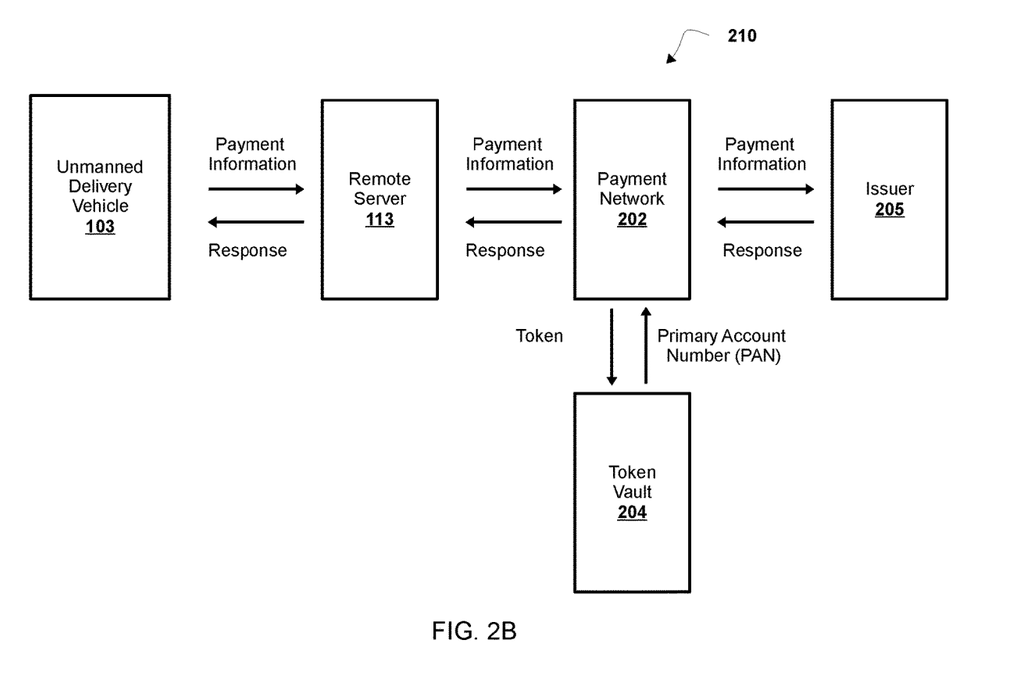
FIG. 2B depicts aspects of a process flow that may be present when processing a payment transaction involving an unmanned delivery vehicle.

FIG. 2B depicts aspects of a process flow 210 that may be present when processing a payment transaction involving the unmanned delivery vehicle 103. In some non-limiting embodiments or aspects, upon its receipt of payment information, unmanned delivery vehicle 103 may submit that payment information to remote server 113 over a communication channel. It will be appreciated by a person of skill in the art that the payment information could be transmitted within an ISO 8583 authorization request message, which unmanned delivery vehicle 103 could generate. In some non-limiting embodiments or aspects, unmanned delivery vehicle 103 may also provide the transaction amount for payment, as well as an expiration date, and a card verification value or code (a "CVV" or "CVC"). In an some non-limiting embodiments or aspects, unmanned delivery vehicle 103 need not actually generate and send an authorization request message in any specific format, but could instead merely provide the payment information to remote server 113. If remote server 113 is participating in or connected to a payment network, such as the Visa network, remote server 113 may then forward the payment information received from unmanned delivery vehicle 103 if the payment information is received in the proper format (e.g., ISO 8583). If the payment information has not been provided in the proper format, remote server 113 may generate and populate the proper message accordingly. Remote server 113 may then forward the payment information, the transaction amount, and any other necessary data to a payment network 202. If a transaction amount is not provided to remote server 113 by unmanned delivery vehicle 103, remote server 113 may insert the transaction amount if the transaction amount is available.

In some non-limiting embodiments or aspects, the payment information may be "tokenized". In such embodiments, the payment information sent by unmanned delivery vehicle 103 may not be an actual financial account number, but rather, randomly assigned or cryptographically generated data that represents an account number along with other data, such as a cryptogram and a token assurance level. Tokenization is one way for protecting sensitive data and is used in some payment networks, such as the Visa payment network. In such cases, payment network 202, or a token service provider operating therein, may optionally detokenize the payment information to retrieve actual account information. This may occur through communication with token vault 204, in which payment network 202 may provide the tokenized payment information to token vault 204, and token vault 204 may identify the account information that corresponds to the tokenized payment information. Token vault 204 may then provide the account information to payment network 202.

Payment network 202 may send account information, along with any other necessary data, such as the transaction amount, to an issuer 205. Issuer 205 may, among other things, determine whether the account corresponding to the account information received has sufficient funds or credit available to authorize a payment transaction. Issuer 205 may then provide that result in the form of a response, indicating transaction approval or decline, to payment network 202. Payment network 202 may then relay that response to remote server 113 and subsequently unmanned delivery vehicle 103. Such response may optionally be provided according to the ISO 8583 authorization response message. As described in the other figures herein, unmanned delivery vehicle 103 may then release item 105 if the response received indicates that the transaction was approved. Otherwise, unmanned delivery vehicle 103 may retry the transaction or depart if the response received indicates that the transaction was declined. A person of skill in the art will appreciate that the process depicted in FIG. 2B is one possible way of performing a payment transaction, and that numerous other methods exist for processing a payment transaction, all of which may be suitable for use in the non-limiting embodiments disclosed herein.

Figure 3:
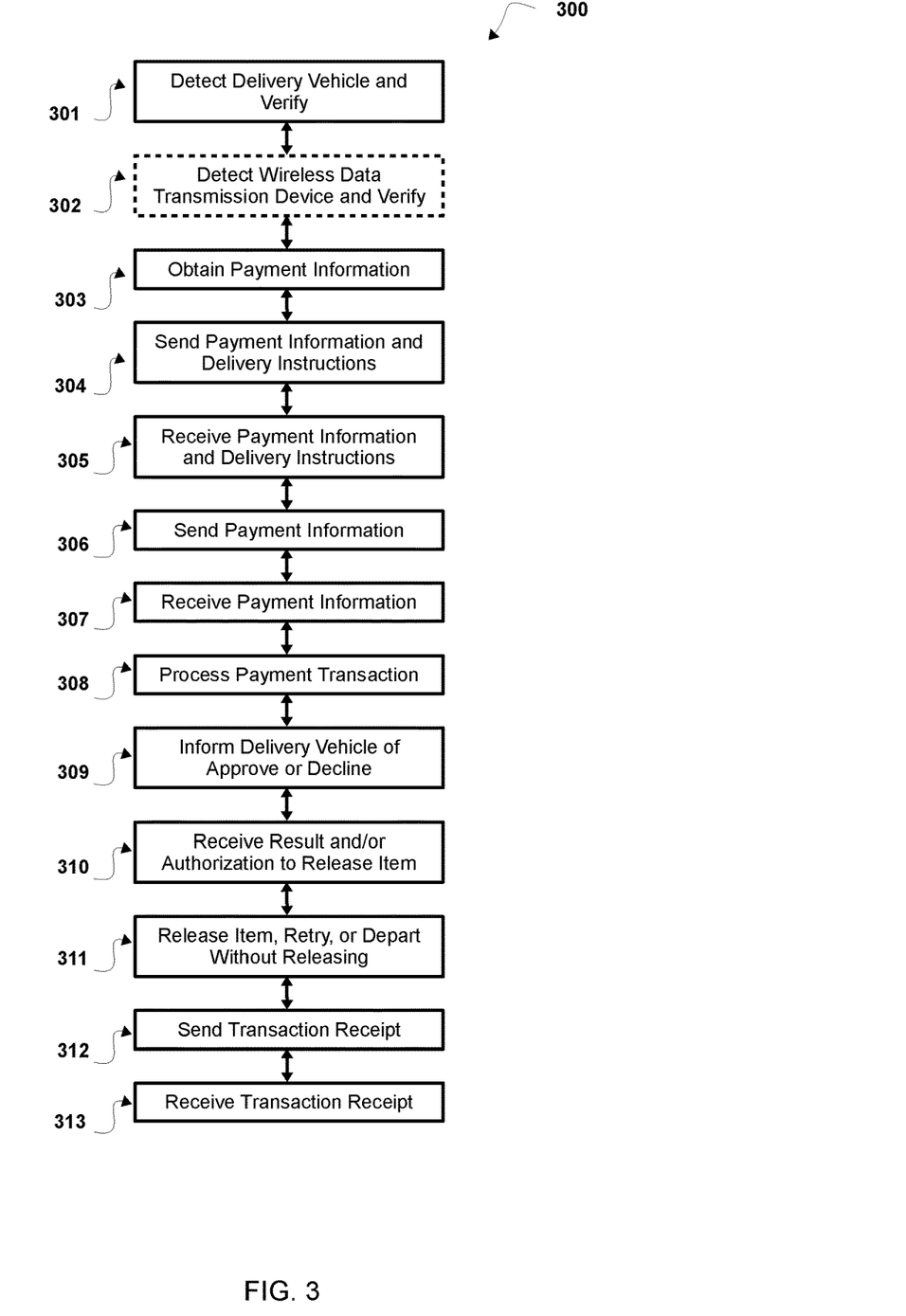
FIG. 3 depicts a process flow for providing payment information and delivery instructions to a delivery vehicle in accordance with some non-limiting embodiments or aspects.

FIG. 3 depicts a process flow 300 for providing payment information and delivery instructions to an unmanned delivery vehicle in accordance with at least some non-limiting embodiments or aspects. The process flow 300 may begin by a wireless data transmission device detecting and verifying an unmanned delivery vehicle at step 301, or in the alternative, an unmanned delivery vehicle may detect and verify a wireless data transmission device at step 302. At step 303, a wireless data transmission device may optionally obtain payment information, if the payment information is not already stored within that device or that device's tamper-resistant memory. In some non-limiting embodiments or aspects, a wireless data transmission device may request or retrieve payment information via the Internet from a financial institution or payment network, and may do so at a time contemporaneous with the occurrence of a payment transaction. In such instances, a wireless data transmission device may or may not permanently store that payment information, although it is recognized that in such embodiments payment information may reside in a memory or other storage mechanism ephemerally. Alternatively, in some non-limiting embodiments or aspects, a wireless data transmission device may store the payment information in a tamper-resistant memory for this and future uses.

At step 304, a wireless data transmission device may send payment information and delivery instructions to an unmanned delivery vehicle, and the unmanned delivery vehicle may receive the payment information and delivery instructions at step 305. Proceeding to step 306, an unmanned delivery vehicle may then transmit payment information to a remote server for transaction approval. Transmission of the payment information from an unmanned delivery vehicle to a remote server may occur in a number of different ways. In some non-limiting embodiments or aspects, this information may be transmitted via a long-range communication channel, such as over a cellular network link or satellite link. In some non-limiting embodiments or aspects, payment information may be sent by an unmanned delivery vehicle via a medium-range wireless communication channel, in which the data is relayed between other delivery vehicles, wireless data transmission devices, access points, or other devices until the payment information reaches a remote server. Such relays could occur using wireless mesh networking technologies or could leverage the nearby devices as signal repeaters, and although likely a slower communication method, could be leveraged if cellular or satellite communications networks are unavailable or unreachable. In some non-limiting embodiments or aspects, which are not explicitly depicted in FIG. 3, if a wireless data transmission device has an available Internet connection, an unmanned delivery vehicle may utilize the medium-range wireless communication channel that has been established with the wireless data transmission device to create a "tunnel" and connect to a remote server via the Internet connection of the wireless data transmission device.

In some non-limiting embodiments or aspects, the unmanned delivery vehicle may then transmit the payment data to a remote server, as depicted in step 306. At step 307, a remote server may receive the transmitted payment information and may then proceed to process the payment transaction at step 308. This may entail a remote server sending the payment information to a financial institution or payment network. In some non-limiting embodiments or aspects, a remote server may actually belong to such entities, in which case, a remote server may have the ability to approve or decline a transaction. At step 309, a remote server may then inform an unmanned delivery vehicle of whether the transaction was approved or declined, and consequently, whether or not the item to be delivered may be released. As previously stated, this communication may occur over a long-range wireless communication channel, a medium-range wireless communication channel, or through a "tunnel" established over the Internet connection of the wireless data transmission device.

At step 310, an unmanned delivery vehicle may receive a transaction approval or decline message, and authorization to release the item, if the transaction was approved. At step 311, an unmanned delivery vehicle may release the item if the transaction was approved, in accordance with delivery instructions received at step 305. If the transaction was not approved, an unmanned delivery vehicle may retry the transaction or depart without releasing the item. At step 312, assuming the transaction was successful, an unmanned delivery vehicle may provide to a wireless data transmission device a transaction receipt, which the wireless data transmission device may send via the medium-range wireless channel in some non-limiting embodiments or aspects, along with evidence of delivery, such as a photo taken by an on-board camera. At step 313, a wireless data transmission device may receive and store the transaction receipt in a memory.

Figure 4:
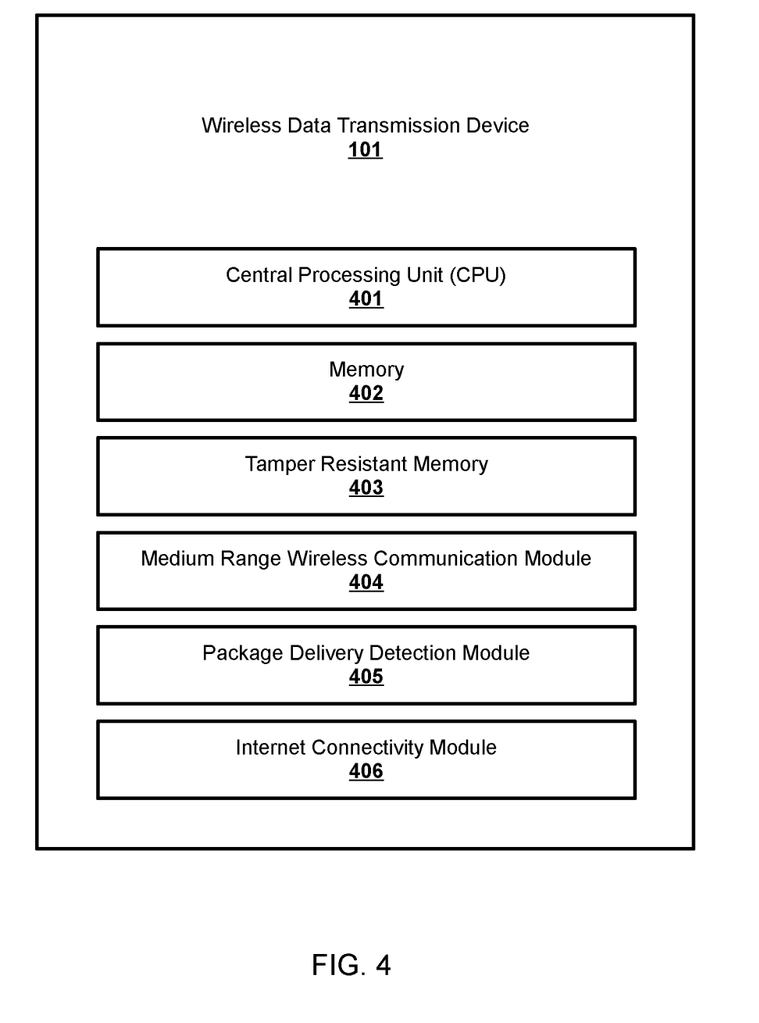
FIG. 4 depicts aspects of elements that may be present in a wireless data transmission device configured to implement a method and/or process in accordance with some non-limiting embodiments or aspects of the present disclosure.

FIG. 4 depicts aspects of elements that may be present in a wireless data transmission device 101. Wireless data transmission device 101 may contain at least one central processing unit ("CPU" or "processor") 401, which is used for executing computer instructions. Wireless data transmission device 101 may also contain a computer memory 402 capable of storing data, including executable instructions and other information necessary for operation. Wireless data transmission device 101 may also contain a tamper-resistant memory 403, which may be used as temporary or long-term storage of secure data, or in some non-limiting embodiments or aspects, payment information, such as payment card information, banking information, or other types of sensitive data used for performing a payment transaction. Additionally, wireless data transmission device 101 may also contain a medium-range wireless communication module 404, which may comprise software, circuitry, and other hardware, or a combination thereof capable of establishing communication with, and transmitting data to and receiving data from, approaching delivery vehicles within a local proximity using a medium-range wireless communication channel. Non-limiting examples of such wireless communication modules may include a WiFi® or Bluetooth® radio, baseband processors, a microcontroller, antennae, or any other hardware or software-based communications module capable of medium range (sub-50 meters) communication. Wireless data transmission device 101 may also contain a package delivery detection module 405, which may be software, hardware, or a combination of the two useful in detecting and interrogating incoming delivery vehicles. Package delivery detection module 405 may also be part of the medium-range wireless communication module or could alternatively utilize any suitable technologies for detecting an incoming delivery vehicle and determining that such vehicle is transporting a package that is either expected for delivery or intended for delivery to an entity or location known to wireless data transmission device 101. Wireless data transmission device 101 may also contain an Internet connectivity module 406, enabling wireless data transmission device 101 to connect to the Internet. Non-limiting examples of an Internet connectivity module 406 may include an on-board modem, network bridge, or other circuitry enabling bidirectional data communication with an Internet Service Provider or any other entity capable of providing connectivity to the Internet or a telecommunications network. In some non-limiting embodiments or aspects, wireless data transmission device 101 may also function as a router, modem, network switch, repeater, home automation hub, smartphone, tablet, any other computing, telecommunications, or networking equipment, or any combination thereof, and may also be responsible for providing and maintaining a connection to the Internet through a telecommunications network. The Internet connection maintained by wireless data transmission device 101 may utilize fixed, wire-based physical layer connections over any suitable mediums, such as coaxial cables, fiber optic cables, Ethernet cables, or telephone lines, or via a wireless medium, such as LTE, WiMAX, satellite link, packet radio, or any other suitable communication medium.

Figure 5:
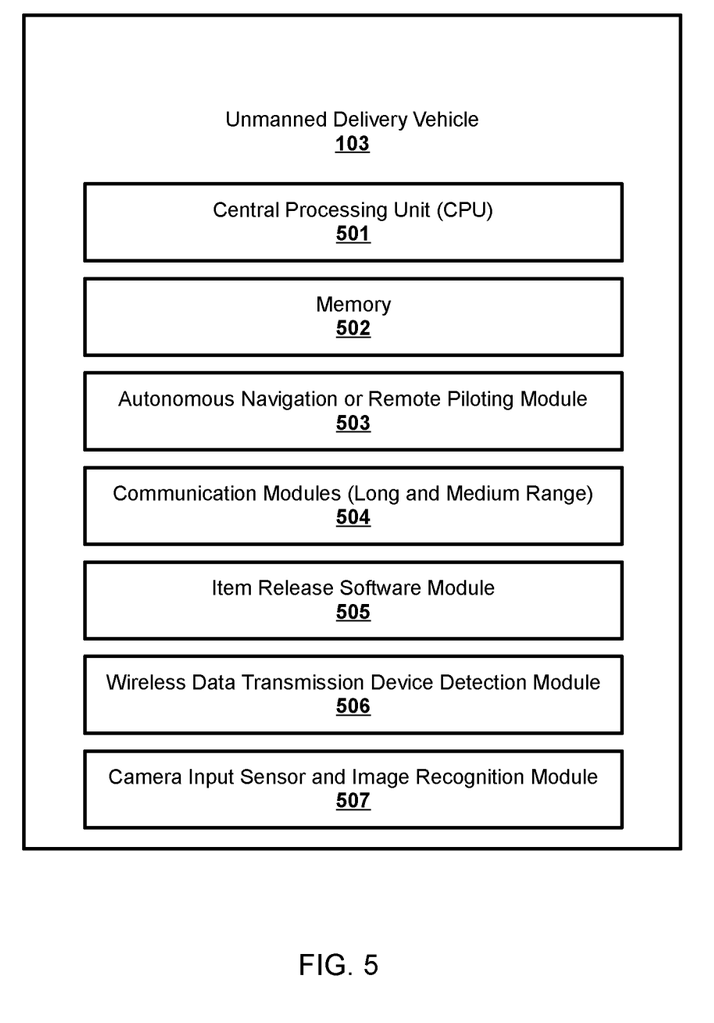
FIG. 5 depicts aspects of elements that may be present in an unmanned delivery vehicle configured to implement a method and/or process in accordance with some non-limiting embodiments or aspects of the present disclosure.

FIG. 5 depicts aspects of elements that may be present in an unmanned delivery vehicle 103 configured to implement a method and/or process in accordance with some non-limiting embodiments or aspects of the present disclosure. As previously described throughout the other figures herein, an unmanned delivery vehicle 103 may also include, among other things, numerous hardware and software components, including at least one central processing unit ("CPU" or "processor") 501, which may be used for executing computer instructions, a computer memory 502, which may be capable of storing data, including executable instructions and other information necessary for operation. Unmanned delivery vehicle 103 may also include an autonomous navigation or a remote piloting module 503, which may be hardware, software, or a combination thereof, that may enable unmanned delivery vehicle 103 to reach a desired destination either autonomously or via a remotely located pilot in control of unmanned delivery vehicle's movement. Unmanned delivery vehicle 103 may also contain communication modules 504, which may enable long- and medium-range wireless communication. Communication modules 504 may be hardware, software, or any combination thereof to enable such wireless communications with wireless data transmission devices, remote servers, and any connection intermediaries. Non-limiting examples of such communication modules may include wireless radios, antennae, and baseband processors capable of communicating over various communication channels and using any suitable wireless communication protocols, such as IEEE 802.11, Bluetooth®, Bluetooth Low Energy, WPAN/IEEE 802.15. Item release software module 505 may be a preprogrammed software application that enables unmanned delivery vehicle 103 to drop, place, or project an item to a desired location via the control of a release and carrying mechanism. Item release software module 505 may contain computer executable instructions which operate the opening and closing of certain types of carry and release mechanisms. In some non-limiting embodiments or aspects, item release software module 505 may receive a signal from CPU 501 or camera input sensor and an image recognition module 507 indicating arrival at or proximate to a desired delivery location, and instructing release of an item through execution of computer instructions which operate the opening and closing of certain types of carrying and release mechanisms. In some non-limiting embodiments or aspects, item release software module 505 may perform calculations relating to how an item may be released to accurately reach a destination location, considering as inputs to such calculations environmental factors such as wind speed, current height/altitude of unmanned delivery vehicle 103, weather conditions, weight of the carried item, fragility of the carried item, durability, and any other relevant information to determine trajectories, velocities, and desirable methods for depositing packages to ensure damage-free delivery of an item to a precise location. Unmanned delivery vehicle 103 may also optionally contain wireless data transmission device detection module 506, which may be used to detect the presence of a wireless data transmission device corresponding to a particular delivery, and which may further facilitate setting up a communication link with a wireless data transmission device. It should be appreciated that such detection and interrogation may occur as part of normal communications with the wireless data transmission device, and that communication modules 504 may comprise wireless data transmission device detection module 506 or may perform even its functions. Unmanned delivery vehicle 103 may also contain camera input sensor and image recognition module 507, which may be a combination of hardware and software, and may comprise or operate in conjunction with an on-board camera, RADAR sensor, LIDAR sensor, or any other sensing technologies and associated software used in autonomous navigation and travel. Camera input sensor and image recognition module 507 may assist in navigation, collision avoidance, identification of desired delivery locations, and in recording travel and package delivery confirmation.

It should be understood and appreciated by a person of skill in the art that nothing in the above is intended to limit the functionality and structures described herein. The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents. One or more features from any embodiment may be combined with one or more features of any other embodiment without departing from the scope of the disclosure. A recitation of "a," "an," "the," or "at least one" is intended to mean "one or more" unless specifically indicated to the contrary. All patents, patent applications, publications, and descriptions mentioned above are herein incorporated by reference in their entirety for all purposes. None is admitted to be prior art.

What is claimed is:

1. An item delivery system comprising an unmanned delivery vehicle configured to:
   receive a first secret code from a trusted party;
   navigate to a recipient location with an item on board;
   detect a wireless data transmission device;
   exchange, with the wireless data transmission device, the first secret code for a second secret code, wherein the second secret code is received by the wireless data transmission device from the trusted party;
   verify the second secret code with the trusted party to authenticate the wireless data transmission device, wherein the wireless data transmission device verifies the first secret code with the trusted party to authenticate the unmanned delivery vehicle;
   receive payment information from the wireless data transmission device upon arrival at the recipient location, wherein the payment information is used to initiate a transaction;
   generate an authorization request message comprising the payment information;
   transmit the authorization request message to a remote server;
   receive an authorization response message comprising an indication that the transaction is approved; and
   release the item based on receiving the authorization response message indicating the transaction is approved.

2. The item delivery system of claim 1, wherein the payment information is received from the wireless data transmission device over a medium-range wireless communication channel.

3. The item delivery system of claim 1, wherein the unmanned delivery vehicle is further configured to:
   automatically detect a presence of the wireless data transmission device.

4. The item delivery system of claim 1, wherein the authorization request message is transmitted to the remote server over a long-range wireless communication channel.

5. The item delivery system of claim 1, wherein the unmanned delivery vehicle is further configured to operate without user intervention.

6. The item delivery system of claim 1, wherein the payment information comprises a payment token.

7. The item delivery system of claim 1, wherein, when releasing the item, the unmanned delivery vehicle is configured to:
release the item at the recipient location based on receiving the authorization response message indicating that the transaction is approved.

8. An item delivery system comprising a wireless data transmission device configured to:
receive a first secret code from a trusted party;
detect an unmanned delivery vehicle transporting an item;
exchange the first secret code for a second secret code, wherein the second secret code is received by the unmanned delivery vehicle from the trusted party;
verify the second secret code with the trusted party to authenticate the unmanned delivery vehicle, wherein the unmanned delivery vehicle verifies the first secret code with the trusted party to authenticate the unmanned delivery vehicle;
transmit payment information to the unmanned delivery vehicle upon the unmanned delivery vehicle arriving at a recipient location, wherein the payment information is used to initiate a transaction; and
provide an item release location to the unmanned delivery vehicle.

9. The item delivery system of claim 8, wherein the item release location comprises at least one of a physical address, location coordinates, a business name, or any combination thereof.

10. The item delivery system of claim 8, wherein the wireless data transmission device is further configured to:
obtain, from a remote server, the payment information; and
store in a tamper-resistant memory, the payment information.

11. The item delivery system of claim 10, wherein the payment information comprises a payment token.

12. The item delivery system of claim 8, wherein the wireless data transmission device is further configured to:
transmit to the unmanned delivery vehicle, information identifying at least one of the item, an order, an identity of an intended recipient, or any combination thereof.

13. The item delivery system of claim 8, wherein the wireless data transmission device is further configured to:
open a secured location for entry by the unmanned delivery vehicle, wherein access to the secured location is required to reach the item release location.

14. The item delivery system of claim 8, wherein the wireless data transmission device is configured to:
automatically detect a presence of the unmanned delivery vehicle.

15. The item delivery system of claim 8, wherein the wireless data transmission device is configured to operate without user intervention.

16. An item delivery system comprising a non-transitory computer memory including executable instructions that, when executed by a processor of an unmanned delivery vehicle, cause the processor to:
receive a first secret code from a trusted party;
navigate the unmanned delivery vehicle to a recipient location with an item on board;
detect a wireless data transmission device;
exchange, with the wireless data transmission device, the first secret code for a second secret code, wherein the second secret code is received by the wireless data transmission device from the trusted party;
verify the second secret code with the trusted party to authenticate the wireless data transmission device, wherein the wireless data transmission device verifies the first secret code with the trusted party to authenticate the unmanned delivery vehicle;
receive payment information from the wireless data transmission device upon arrival at the recipient location, wherein the payment information is used to initiate a transaction;
generate an authorization request message comprising the payment information;
transmit the authorization request message to a remote server;
receive an authorization response message comprising an indication that the transaction is approved; and
release the item from the unmanned delivery vehicle based on receiving the authorization response message indicating the transaction is approved.

* * * * *